T. L. KNAPP.
SHIFT MECHANISM FOR TYPE WRITERS.
APPLICATION FILED MAR. 14, 1908.
906,497.
Patented Dec. 8, 1908.
3 SHEETS—SHEET 1.
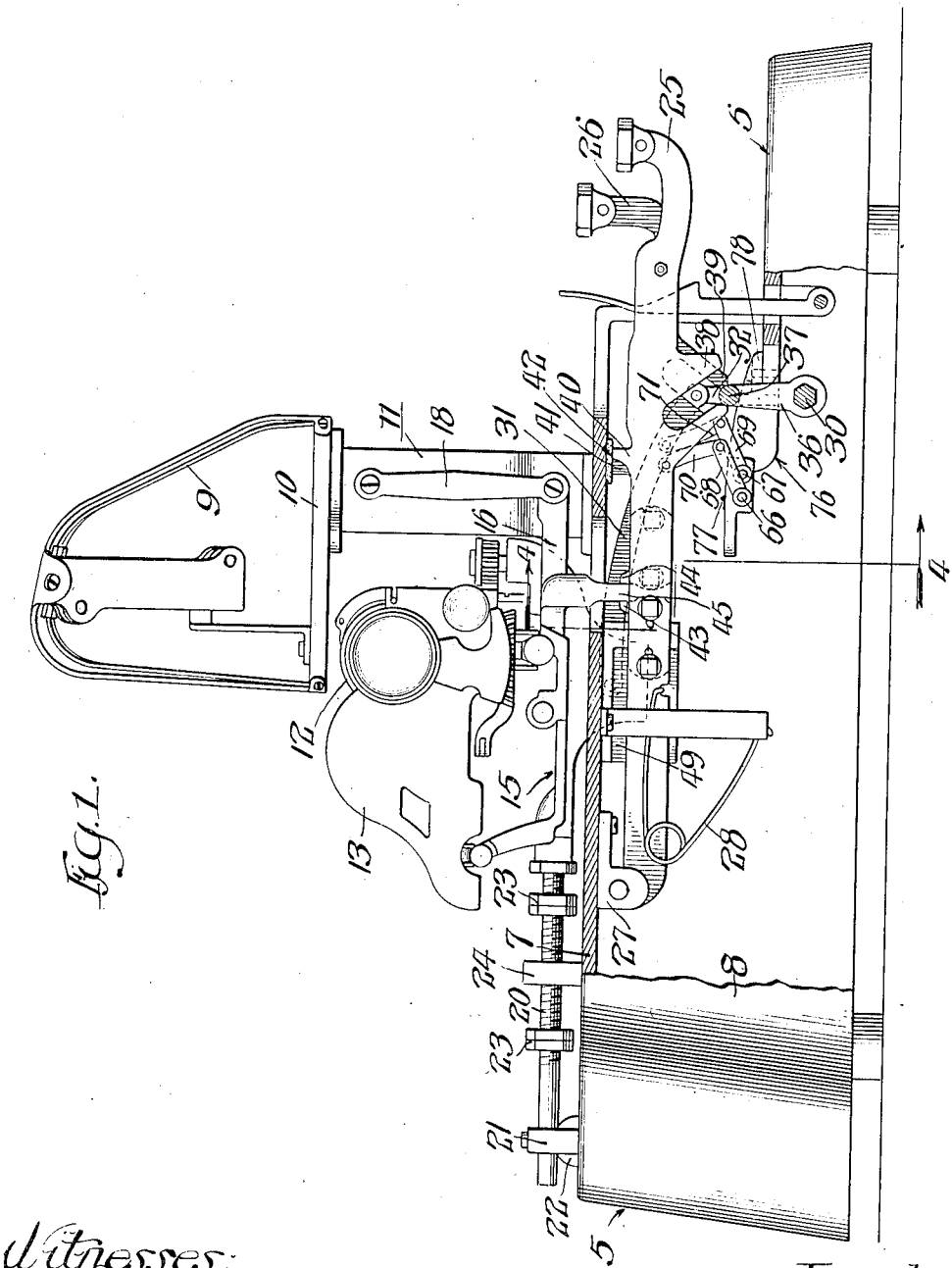
Witnesses:
P. H. Alfreds
G. A. Wilkins
Inventor
Theron L. Knapp
by Poole & Brown
Attys

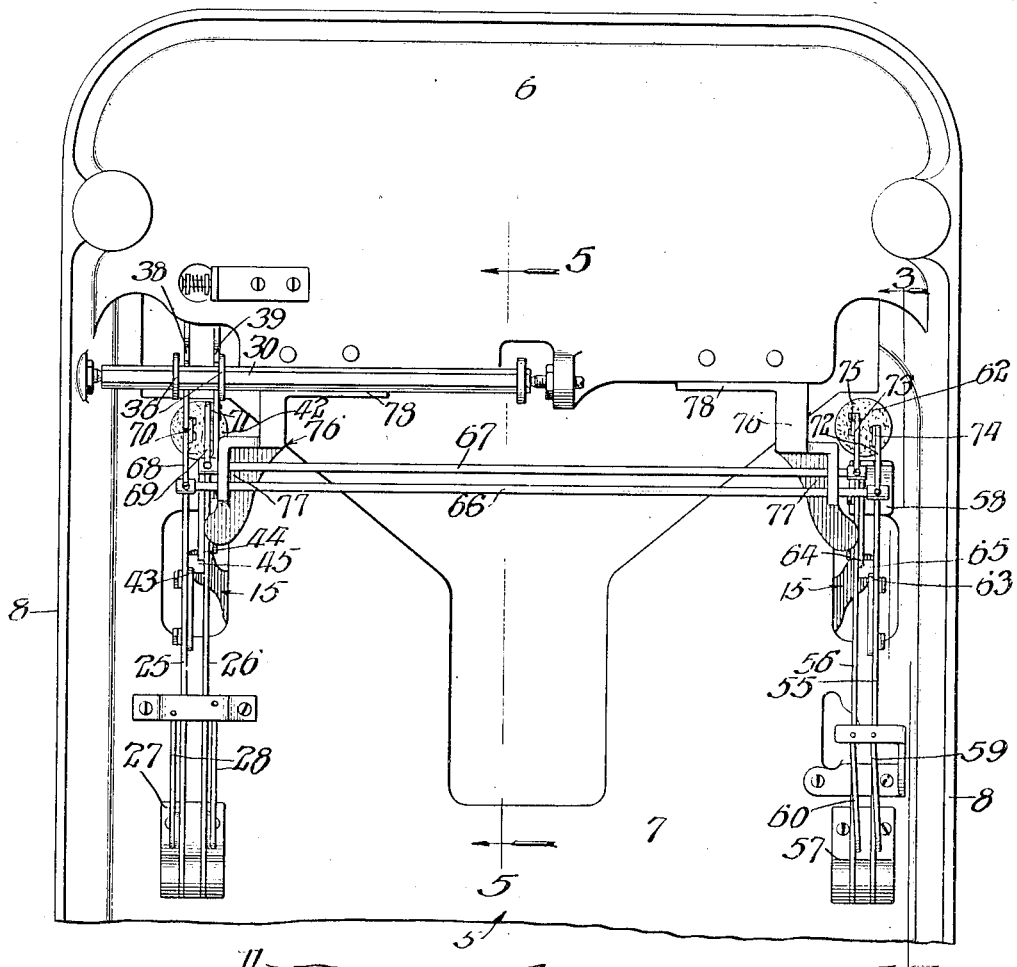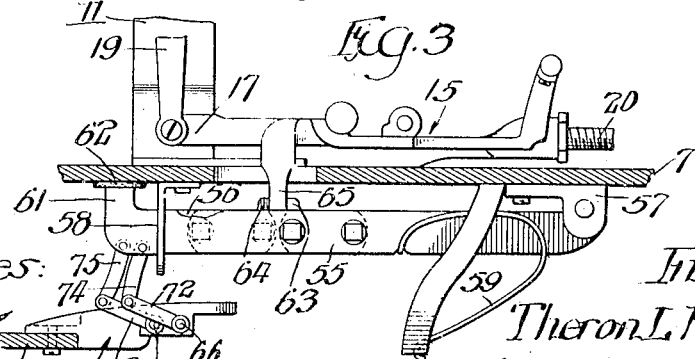

T. L. KNAPP.
SHIFT MECHANISM FOR TYPE WRITERS.
APPLICATION FILED MAR. 14, 1908.
906,497.
Patented Dec. 8, 1908.
3 SHEETS—SHEET 3.
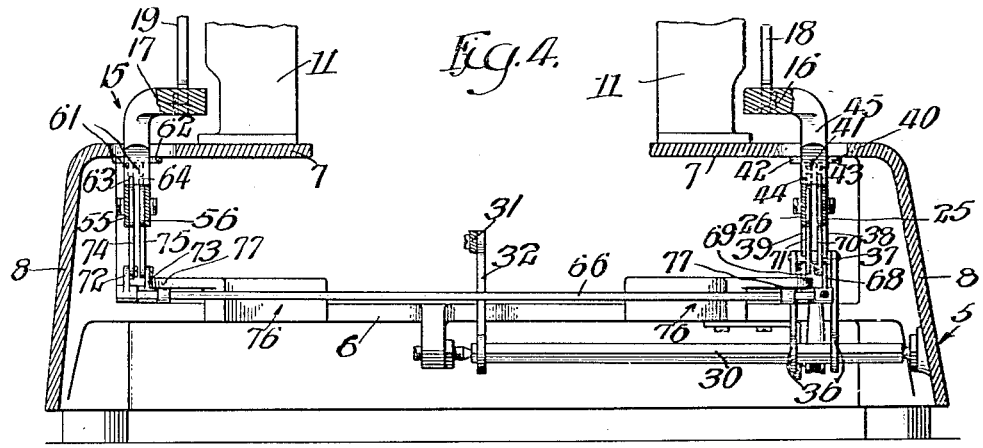
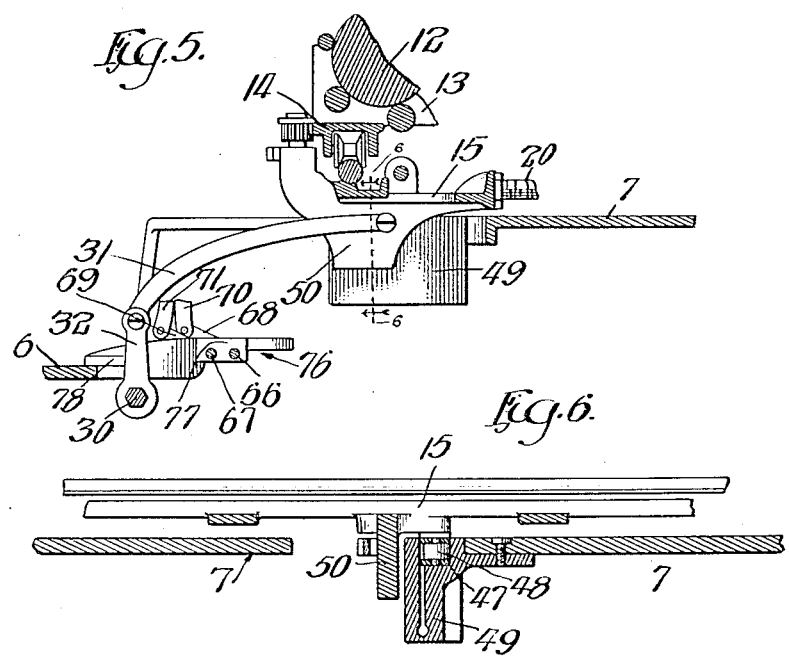
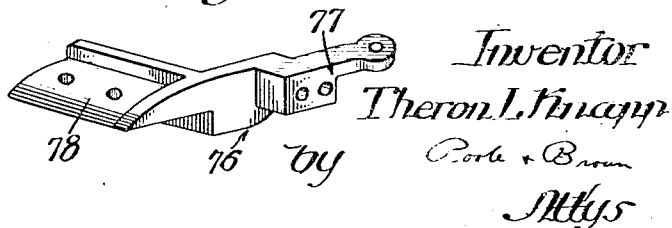
Witnesses:
P. H. Alfreds
G. R. Wilkins
Inventor
Theron L. Knapp
by Poole & Brown
Attys

UNITED STATES PATENT OFFICE.

THERON L. KNAPP, OF WOODSTOCK, ILLINOIS, ASSIGNOR TO THE OLIVER TYPEWRITER COMPANY, OF CHICAGO, ILLINOIS, A CORPORATION OF ILLINOIS.

SHIFT MECHANISM FOR TYPE-WRITERS.

No. 906,497.           Specification of Letters Patent.           Patented Dec. 8, 1908.

Original application filed December 13, 1907, Serial No. 406,338. Divided and this application filed March 14, 1908. Serial No. 421,241.

*To all whom it may concern:*

Be it known that I, THERON L. KNAPP, a citizen of the United States, of the city of Woodstock, in the county of Cook and State of Illinois, have invented certain new and useful Improvements in Shift Mechanism for Type-Writers; and I do hereby declare that the following is a full, clear, and exact description thereof, reference being had to the accompanying drawings, and to the letters of reference marked thereon, which form a part of this specification.

This application is a division of my prior application, Serial Number 406,338, filed December 13th, 1907.

This invention relates to platen shift devices for typewriting machines, and it embraces improvements in such platen shift devices of the kind more especially applicable to machine known as "Oliver" typewriters, such as is shown and described in the prior patent granted to Thomas Oliver, No. 599,863, dated March 1st, 1898. Some of the features herein described and claimed are, however, applicable to machines which differ in construction from said Oliver typewriting machines.

The invention consists in the matters hereinafter described and pointed out in the appended claims.

My invention may be more readily understood by reference to the accompanying drawings, in which,—

Figure 1 is a view partially in side elevation and partially in section of a typewriting machine equipped with platen shift devices embodying my invention. Fig. 2 is a view of the forward part of the machine as seen from beneath. Fig. 3 is a detail vertical section taken upon line 3—3 of Fig. 2. Fig. 4 is a transverse vertical section of the machine taken upon line 4—4 of Fig. 1. Fig. 5 is a detail, vertical section taken from front to rear through the central part of the machine on line 5—5 of Fig. 2. Fig. 6 is a detail cross-section taken upon line 6—6 of Fig. 5. Fig. 7 is a perspective view of one of the frame brackets forming a part of the invention.

Referring briefly to the general features of construction in the machine illustrated, 5 indicates the base plate of the machine which is provided with a horizontal, lower forward portion 6 and with rear, elevated, horizontal portion 7, made integral with a depending marginal base flange 8 extending entirely around the base plate.

9 indicates one of the type-bars of the machine, of the form employed in said "Oliver" typewriting machine. Said type bars are arranged in two groups located one at each side of the center line of the machine. The type-bars of each group are mounted on a supporting frame, one of which is indicated by 10 in Fig. 1. The supporting frames for the two groups are attached to the upper ends of two frame standards 11, 11 which are attached to and rise from the elevated rear part of the base-plate 5 as seen in Figs. 1 and 4. Said type-bars are each provided with three types. 12 indicates a platen mounted on the paper-carriage having end plates 13 and longitudinal frame pieces, one of which is indicated by 14 in Fig. 5.

15 indicates the shift-frame which is mounted on the base plate and on which the paper carriage has endwise movement. Said shift-frame is capable of movement backwardly and forwardly from its central position so that the platen may be brought under the striking point of any one of the three types upon each type-bar. Said shift-frame is provided at its forward end, at opposite sides of the machine, with arms 16, 17, to which are pivoted the lower ends of upright suspension links or hangers 18, 19 pivotally connected at their upper ends with the standard 11 as shown in Patent No. 837,611 granted to H. Cross, December 4th, 1906. The rear end of said shift-frame is provided with a centrally arranged guide-rod or stem 20 which moves endwise through a standard 21 on the base plate of the machine, which standard is provided with a supporting roller 22 on which said stem rests. The forward and rearward movement of the shift-frame is limited by means of stop-nuts 23, 23 on the stem 20 arranged at opposite sides of and adapted for contact with a second standard 24 on the base-plate.

25, 26 indicate shift-levers for actuating the shift-frame located at the left-hand side of the machine. Said shift-levers are pivoted at their rear ends to a bracket 27 attached to the under surface of the elevated rear part of the base-plate, and lifting springs 28 are applied to lift the forward ends of said shift-levers, to which are attached the shift-keys.

30 indicates a horizontal transverse rock-shaft by means of which motion is transmitted from the shift-levers to the shift frame. Said rock-shaft is connected with the shift-frame by means of a connecting bar 31 (Fig. 5) pivoted at its forward end to a rigid, upwardly extending arm 32 on said rock-shaft. Said rock-shaft is provided beneath the shift-levers with arms 36, 36 carrying a crank-pin 37 adapted to engage oblique cam-slots formed by arms 38, 38 and 39, 39 which are attached to and depend from the shift-levers. The forward ends of the shift-levers are provided with upwardly extending stop-arms 40 and 41 adapted for contact with the lower surface of the base-plate to limit the upper movement of the shift-levers. A cushioning piece 42 is secured to the base-plate in position to receive impact of the shift-levers when thrown upward by their lifting springs. Said shift-levers are provided with forwardly and rearwardly facing stops 43, 44 adapted to engage a rigid, downwardly extending stop-arm 45 on the left-hand end of the shift-frame. Said stops serve to arrest the return movement of the left-hand end of the shift-frame and hold the same immovable in its central position. The shift frame is provided with a depending guide-block 47 which extends downwardly through a centrally arranged, longitudinal slot or opening in the elevated rear part of the base-plate and is provided with guide rollers, one of which is indicated by 48 (Fig. 6), arranged to bear laterally against a forwardly and rearwardly extending guide-surface on the left hand side of the guide-block 47, under the lateral pressure exerted on the shift-frame by the action of the carriage actuating spring. A block 49 is secured by screws to the under surface of the elevated part of the base-plate and is provided with a longitudinal groove (Fig. 6) the side walls of which form the guide surface referred to and also a guide for the right hand side of said guide block. Said shift-frame is also provided with a depending arm 50 which extends downwardly through the slot or opening referred to and to which is pivoted the rear end of the connecting link 31 by which the shift frame is actuated from the rock-shaft 30.

One feature of my invention relates to devices for locking or holding the right hand side of the shift frame in its central position. The parts constituting the same are constructed as follows: 55, 56 indicate a pair of stop-levers similar to the shift-levers 25—26 which are arranged horizontally below the rear elevated part 7 of the base-plate at the right hand side of the same. Said stop-levers extend longitudinally from front to rear of the machine and are pivoted at their rear ends to a depending bracket 57 on the rear elevated part 7 of the base-plate in a manner allowing their forward ends to swing in a vertical plane. Said levers 55, 56 engage at their forward ends vertical guide-slots formed in a guide-plate 58 which is attached to and depends from the base-plate. Lifting springs 59, 60, shown as made of wire and of U-form are applied to lift the forward ends of said stop-levers. The forward ends of said levers are provided with upwardly directed arms 61 (Fig. 3) adapted for contact, when the levers are elevated, with the under surface of the base-plate which forms a stop for limiting their upward movement. A cushioning piece 62 of leather or the like is shown as attached to the base-plate in position to receive impact of said levers when thrown upwardly by their lifting springs. Said stop levers 55, 56 are provided with forwardly and rearwardly facing stops 63, 64 (Fig. 4) similar in all respects to the stops 43, 44, on the levers 25, 26, and which are adapted to engage a rigid depending stop-arm 65 on the right hand end of the shift-frame. Said stops 63, 64 serve to arrest the return movement of the right-hand end of the shift-frame and hold the same immovable in its central position.

66, 67 indicate parallel, horizontal rock-shafts extending across the machine and provided at their left-hand ends beneath the shift-levers with two horizontally extending crank-arms 68, 69 connected with the shift-levers by upright links 70, 71. At the right hand side of the machine said rock-shafts 66, 67 are provided with rigidly attached crank-arms 72, 73 which are connected with the two stop-levers 55 and 56 by means of links 74 and 75.

The parts are so arranged that when one of the shift-levers 25 or 26 is depressed, it will carry with it the stop 43 or 44 attached thereto, thus releasing the left-hand end of the shift-frame, and at the same time, through one of the rock-shafts 66 or 67 with its crank-arm and connecting link, will depress the corresponding stop-lever 65 or 66, thereby releasing the right-hand end of the shift-frame. That one of each pair of stops which is not moved or shifted, in either case, remains in position to arrest the movement of the shift-frame when it returns to its central position. The construction set forth, therefore, provides means for simultaneously locking and releasing both ends of the shaft frame, by the actuation of either one of a pair of shift keys located at one side of the machine.

Another feature of my invention relates to the means in a typewriting machine of the general character illustrated, for pivotally supporting the rock-shafts 66, 67 of the shift-frame locking device. The means illustrated for this purpose consists in a pair of like bracket members 76, 76 which are arranged at opposite sides of the base-plate and are attached to and extend rearwardly from the rear margin of the lower horizontal, forward part 6 of said base-plate. Each of said bracket members (Fig. 7) comprises a bracket portion 77 which extends in a direction from front to rear of the machine and rearwardly from the part 6 of the base-plate, and a horizontally disposed base portion 78 arranged at right angles to the bracket portion 77 and which extends transversely of the machine. Said base portion is arranged to overlap the rear margin of said lower forward part 6 of the base-plate, to which it is secured by screws or bolts. The bracket portion 77 of each bracket member is provided with two transverse, horizontal bearing apertures, through which extend the ends of the shafts 66 and 67 and in which the latter have bearing.

The bracket members, arranged as described, afford a simple and practicable means for supporting the rock-shafts 66 and 67 in connection with a base-frame or plate made as illustrated and hereinbefore described.

I claim as my invention:—

1. In a typewriting machine, the combination with the machine frame, a paper-carriage and a shift-frame on which the paper-carriage is mounted, of vertically swinging shift-levers at one side of the machine frame having operative connection with the shift-frame and provided with stops for engagement with the adjacent end of the shift-frame, a locking device for the opposite side of the shift-frame comprising two horizontally arranged, vertically swinging locking levers provided with stops adapted for engagement with the adjacent side of the shift-frame and two rock-shafts extending transversely of the machine frame and having operative connection with said shift-levers and with the locking levers.

2. In a typewriting machine, the combination with the machine frame, a paper-carriage and a shift-frame on which the paper-carriage is mounted, of vertically swinging shift-levers at one side of the machine having operative connection with the shift-frame and provided with stops for engagement with the adjacent side of the shift-frame, a locking device for the opposite side of the shift-frame comprising two horizontal, vertically swinging locking levers provided with stops adapted for engagement with the adjacent side of the shift-frame, two rock-shafts extending transversely of the machine frame and provided with horizontally extending, rigidly attached crank-arms, and links severally connecting said crank-arms with the said shift-levers and locking levers.

3. In a typewriting machine, the combination with a base-plate having a lower, horizontal, forward portion and a higher, horizontal, rear part, of a shift-frame mounted on the base-plate, shift-levers at one side of the machine having operative connections with the shift-frame, locking levers mounted at the other side of the machine frame, transversely extending rock-shafts for communicating motion from the shift-levers to the locking levers and two brackets secured to and extending rearwardly from the rear margin of the said lower, horizontal, forward part of the base-plate and affording bearings for the ends of said rock-shafts.

In testimony, that I claim the foregoing as my invention I affix my signature in the presence of two witnesses, this 10th day of March, A. D. 1908.

THERON L. KNAPP.

Witnesses:
BART C. YOUNG,
WM. H. O'BRIEN.